United States Patent Office 3,578,611
Patented May 11, 1971

3,578,611
AROMATIC POLYMERS AND METHOD
Norman Bilow, Los Angeles, and Leroy J. Miller, Canoga Park, Calif., assignors to Hughes Aircraft Company, Culver City, Calif.
No Drawing. Filed Sept. 5, 1967, Ser. No. 665,267
Int. Cl. C08g 33/00, 49/00
U.S. Cl. 260—2
8 Claims

ABSTRACT OF THE DISCLOSURE

The method of providing commercially useful new aromatic polymer compositions from fused aromatic ring compounds as anthracene, naphthalene and phenanthrene, and mixtures thereof, including mixtures of same with monomers and/or polymers of biphenyl, terphenyls, quaterphenyls, and other aromatic monomers and phenylene oligomers and polyphenyls with not more than 5 aromatic rings, and the products thereof which are heat curable resins in combination with monofunctional and preferably polyfunctional curing agents which produce reactive electrophilic intermediates, including such products.

---

The invention herein described was made in the course of or under a contract with the Air Force. This invention relates to the method of producing modified and unmodified, soluble, fusible resin forming polynuclear aromatic polymers from fused aromatic ring compounds and the products produced thereby. More particularly, the invention herein and hereby provided relates to a method for commercial production of useful polymers from anthracene, naphthalene, phenanthrene, and mixtures thereof, including mixtures thereof with biphenyl, terphenyls, quaterphenyls, and other aromatic monomers and phenylene oligomers and polyphenyls with not more than 5 aromatic rings.

Phenylene polymers have heretofore been disclosed in the art as other products and as being prepared by different methods and other starting raw materials. Many of such polymers have been unsuitable and unkown for the purpose of making laminated or molded structures, or for protective coatings having high thermal stability. Such prior art resins have been unsuitable by reason of being substantially insoluble and infusible or had too high fusion or softening points, either remaining permanently fusible or unstable at high temperatures.

Unfortunately, some of the prior art fusible polymers owed their fusibility to the presence of aliphatic groups such as alkyl groups or olefinic groups in the polymer. Often these aliphatic groups were formed during the course of polymerization. Due to the aliphatic groups in these polymers of the prior art, they never possessed the thermal stability of a fully aromatic polymer. Reduced aromatic groups, which are aliphatic in character, for example, are always obtained when the polymers are prepared by Wurtz-Fittig reactions of haloaromatics with alkali metals. It is, therefore, very important that the branched polynuclear aromatic resins of the present invention be produced by a catalytic and oxidative polymerization of aromatic hydrocarbons.

Completely para-linked polyphenylenes have been obtained by several investigators and molecular weights were reported to be as high as 5,000 to 10,000. Completely para-linked polymers are, however, entirely infusible when there are more than eight or nine phenylene groups linked in the para position. As a consequence, fusible para polyphenylenes of high molecular weight cannot be obtained. This is theoretically due to the extremely strong van der Waals forces which the linear molecular structure allows. We have found that by the the careful selection of the proper kind and proportion of aromatic hydrocarbon raw materials, we can form polynuclear aromatic resins of the present invention which have a relatively high molecular weight and are fusible, soluble, and branched aromatic polymers having a carbon:hydrogen ratio greater than 1.46 and on the order of 1.5 to 1.7.

Prior art resins have also been produced from nitrogen-containing aromatic compounds such as diazo compounds. Resins and polymers of these types invariably contain nitrogen and the materials exhibit thermal stabilities far inferior to the fully aromatic hydrocarbon polymers provided herein.

The branched, fully aromatic polynuclear resins of the present invention owe their fusibility and tractability to the presence of naphthyl, anthracenyl, phenyl, or biphenylyl, and the like, branches as well as to a meandering configuration of their longest chains. Because of the existence of these branches and meandering configuration, the polymer molecules cannot attain a planar configuration as the completely para-polyphenylenes do and consequently close packing of the branched polymer molecules does not occur and the extremely strong van der Waals forces, which are present in the completely para-linked polymer, are not observed. The branched polynuclear aromatic resins of this invention are thus fusible, tractable, and fully aromatic.

For many applications in the art of molding and fabricating structures having high thermal stability, it is essential to use a high-temperature-stable polymer which has an intrinsically high molecular weight or which may be cross-linked, cured, vulcanized, and the like, to produce a high molecular weight (or an infinite molecular weight), during the said molding and fabrication process. At the same time, it is essential that the polymer, before curing, or in combination with a curing agent therefor, be fusible and soluble in suitable solvent material and capable of flow under the conditions of heat and pressure that are used in molding and fabrication processes. It is particularly essential that the uncured polymer in combination with a curing agent therefor, with or without partial curing, be soluble in suitable solvents as mono-, di-, and tri-halogenated benzene, chloroform, tetrachloroethane, xylene, trichloroethylene, and the like, including mixtures of solvent material in which the combination, before complete curing, is soluble, so that fillers, fibers and the like can be intimately coated with the polymer and curing material prior to the said molding and fabrication process.

The exceptional characteristics of the branched polynuclear aromatic resins of the present invention may be described in terms of four outstanding properties:

(1) They have excellent thermal stability exhibiting, in the cured state, negligible weight loss between 400–500° C. in inert atmosphere.

(2) They have mean molecular weight ranging from several hundred up to 4,000 or more.

(3) They are sufficiently soluble in certain common organic solvents, as indicated, especially when hot, to permit their use in lacquers and varnishes.

(4) They are fusible and flow sufficiently in combination with a curing agent, at temperatures that are conventionally employed in hot molding presses, to permit their fabrication in conventionally available equipment.

This unique combination of properties, coupled with their ease of preparation in good yield by the process of the present invention, constitutes a significant and major advance in the state of the art of fully aromatic polynuclear aromatic resins. This unique combination of properties is the direct result of the proper choice and proportion of reactants and of the proper choice and use of the catalyst and oxidant in the process of the present invention.

The branched polynuclear polymers of the present invention, discovery, or improvement in the art can now be produced in bulk form for the production of curable, or vulcanizable, compositions which can be fabricated into curable or vulcanizable useful coated, molded and laminated structures having improved heat stability, moisture resistance and chemical inertness. Structures produced therewith include: electrical insulators, rocket nozzles, laminated fabrics, and other structural materials which are required to withstand high temperatures or substantially high temperatures for long periods of time, as in space technology. These polymers can be subjected to heat curing with derivatives of aromatic polymethylol compounds as monomers or polymers thereof when in combination with free and/or associated acid groups, preferably as sulfonic, halogen, and mixtures of same, or an added aromatic polymethylol compound in the presence of an acid catalyst. The curing material is preferably a combination of a derivative of polymethylol aromatic compound formed as an aromatic mono or polysulfonic acid, and preferably an aromatic sulfonyl chloride as disclosed herein and in our cofiled application entitled, "Aromatic Resinous Curing System and Method," Ser. No. 665,303 included herein by reference thereto providing useful curing systems and cured products of the herein described modified and unmodified fuse ring compounds.

Accoringly, it is an important object of this invention to provide a method for producing polynuclear aromatic polymers of fused ring compounds which are soluble in certain solvents and which are fusible and useful in forming molding and laminating compositions with a curing agent and providing useful high temperature resistant, insoluble resins thereof.

It is another object of this invention to provide fusible, soluble, and high-temperature-stable branched polynuclear aromatic polymers of fused ring compounds having utility for various purposes such as molding and laminating resin compositions.

Additional objects will become apparent from the following descriptions, which are given primarily for purposes of illustration and are not to be construed as limiting tse spirit and scope of this inventon.

In the process of the present invention, the aromatic reactants are selected from the group consisting of naphthalene (anthracene, phenanthrene, mixtures thereof and/or mixtures of these compounds with biphenyl, terphenyl, quaterphenyl, isomers thereof, mixtures of these compounds, and mixtures including other aromatic monomers and polymers of not more than 5 aromatic rings. In the case of naphthalene, anthracene, phenanthrene and biphenyl, these exist as only a single compound. In the case of terphenyl, there are three isomers which can be employed in the process of this invention. In the case of quaterphenyl, there are nine isomers which are suitable for this invention. Any single compound or isomer is satisfactory for producing the branched polynuclear aromatic resins of this invention and any mixture of compounds and isomers are also suitable. However, some compounds and isomers or mixtures of compounds and isomers, are more convenient than others. The relative convenience is dictated by such considerations as cost, solubility, melting point, and ease of processing during the course of the polymerization reaction.

More specifically, the modifying portion of the mixtures preferably are aromatic compounds selected from the group consisting of biphenyl, ortho- and meta terphenyls, the 2,2'-, 3,3'-, 2,3'-, 2,4'-, 3,4'-, diphenyl biphenyls, the 1,2,3- 1,2,4- and 1,3,5-triphenylbenzenes, mixtures thereof, and mixtures thereof with other aromatic monomers and/or phenylene oligomers and polyphenyls with not more than five aromatic rings. Further, some small amounts of heterocyclic monomer material, as carbazole and the like, may be included in the polymerization process, if desired.

The catalyst and oxidant relationship and combination employed in the process of the present invention is very critical. As the catalyst, we preferably use a strong anhydrous Lewis acid or Lewis acid combination. The strong Lewis acid compound is an actual catalyst; that is, it may be employed in amounts less than the stoichiometry which the reaction calls for. However, the use of greater than catalytic quantities is not precluded and, in many cases. is to be preferred. The Lewis acid catalyst must be one, or a mixture of such catalysts classed as strong Lewis acids. As the strength of the Lewis acid falls off from the strongest available, then the reaction rate of the process of the present invention falls off sharply. We preferably employ anhydrous to substantially anhydrous Lewis acid catalyst as aluminum chloride. Less preferably, we may use other such catalysts as aluminum bromide, tantalum pentachloride, ferric chloride, antimony pentachloride, gallium tribromide, zirconium tetrachloride, mixtures thereof, including mixtures thereof with aluminum chloride, and the like, for effecting polymerization of the monomers, as required. A preferred useful composition of catalyst and oxidant, reducing manufacturing costs, is a combination of aluminum chloride and ferric chloride, for example, in relatively equivalent proportional relationship.

The oxidant employed in the process of the present invention is consumed in stoichiometric quantities because it is essentially a reactant which is believed to oxidize or convert the partially aliphatic polymer which is formed as an intermediate to a fully aromatic polymer. Therefore, that molar equivalent quantity necessary to fully aromatize the polymer is preferably used as a reactant during the reaction. Less than stoichiometric quantity may be used for improved processability according to the method of copending application of N. Bilow entitled "Method of Synthesizing Polyphenylenes and Products Thereof," Ser. No. 665,264. For each mole of aromatic compound used in the reaction, there is normally required two equivalents of the oxidant because, for each mole of aromatic compound reactant that reacts, two electrons must be removed, thus reducing two molar equivalents of the oxidant.

One of the most efficient oxidants for this process is cupric chloride. In using this oxidant, hydrogen chloride is evolved as a by-product and the cupric chloride is reduced mainly to form cuprous chloride which is inactive as an oxidant. Cupric bromide or cupric chloride and ferric chloride may also be employed, and mixtures thereof, preferably including mixtures of ferric chloride with cupric chloride which are discovered to be economically advantageous. Ferric chloride can serve as both the Lewis acid catalyst and as the oxidant, and in mixture form considerably reduces the manufacturing costs. Cupric sulfate may also be used more economically as the oxidant or mixtures of other oxidant material therewith. In addition, to reduce the amount of solid oxidizing material, it may be desirable to replace a portion of the solid oxidant with oxygen gas or air forced into and bubbled through the mixture. This, in effect, oxidizes the cuprous chloride formed to the cupric form or provides for formation of polymers which have an increased reactivity with aromatic electrophilic curing agents and improved ablative properties.

The following are non-limiting examples of the preparation of soluble, fusible, aromatic polymers and their preparation and curing of the same, as contemplated herein:

EXAMPLE I

One hundred twenty-six grams of naphthalene (1.0 mole) was heated in a flask equipped with a stirrer and air condenser to about 75° C. and 60 grams of cupric chloride (0.5 mole) was added. Sixty-seven grams of anhydrous aluminum chloride (0.5 mole) was added in small increments over a period of 30 minutes with good stirring while the temperature was maintained in the range of 73–112° C. After all the aluminum chloride had been added, the temperature was raised to about 206° C. and maintained at about that temperature for approximately two hours with good stirring and mixing. Although the reaction was carried out for the indicated period of two hours, the reaction appeared to be substantially complete in about one hour as evidenced by the evolution by-product hydrogen chloride.

The cooled reaction mixture was crushed and treated with concentrated hydrochloric acid to remove aluminum chloride unreacted cupric chloride and cuprous chloride. After stirring for 24 hours at room temperature, the material was filtered and extracted three more times with 6 N hydrochloric acid. The extracted resin was washed with methanol, then dried. After crushing again, the resin was placed in a Soxhlet thimble and continuously extracted with hot cyclohexane to remove unreacted raw monomer material and excessively low molecular weight products. After cyclohexane extraction, the residue was extracted continuously in a Soxhlet extractor with hot xylene solvent.

The yield of xylene soluble polynuclear aromatic resin was 26.4 grams. This corresponded to a yield of 82% based on the limiting reagent copper chloride used in the reaction. This fusible, soluble polynuclear aromatic polymer fraction had a melting range of 138°–160° C.

EXAMPLE II

A mixture of 35.6 grams of technical grade anthracene (containing 30–40% anthracene, 20% phenanthrene and 20% carbazole) and 53.3 grams of anhydrous aluminum chloride was heated to 120°±4° C. Over a period of 20 minutes, 53.3 grams of anhydrous cupric chloride was added in small portions and stirred into the mixture. Heating and stirring were continued for another 25 minutes. The reaction mixture was cooled, washed thoroughly with concentrated hydrochloric acid and then with water, and dried. This crude product was placed in a Soxhlet extractor and extracted for 24 hours with a solvent mixture consisting of 15% benzene and 85% naphtha by volume. The insoluble residue was then extracted with chlorobenzene for 24 hours. The chlorobenzene-soluble product was the useful polymer; it weighed 12.5 grams and melted at 165–280° C.

EXAMPLE III

A solution of a polyoxyxylylene curing agent prepared by heating at reflux a mixture of p-xylene glycol (20 g.), benzenesulfonyl chloride (6 g.) and chloroform (100 ml.). Water was removed continuously by trapping it from the condensate and returning the chloroform to the solution. After 2 days, the solids had all dissolved, but heating was continued for a total of 2 weeks. The solution weighed 169 g.

Polynaphthylene (2 g.) prepared as described in Example I was dissolved in a mixture of chloroform (20 ml.) and a portion of the above curing agent solution (8.5 g.). The solvent was then evaporated off under reduced pressure with slight heating, and the residue was ground to a powder. This molding powder softened between 52° and 80° C. and hardened between 165° and 175° C. to form a cured, infusible, machinable solid. Further, such polymer powder was resoluble or redispersible in a lacquer solvent, as indicated, and served as an impregnant in a conventionally moldable form which cured at a temperature in the above range to an insoluble hard resin having the improved properties, as indicated.

EXAMPLE IV

Two parts by weight of polyanthracenylene prepared as described in Example II were mixed with 1 part of 1,3,5-benzenetrisulfonyl chloride, and the mixture was ground to a powder with a mortar and pestle. On being heated, the mixture melted partially at 65° C. and the remainder melted at 80° C. The melt cured quickly to form an infusible solid at about 193° C., having the heat resistant characteristics, as indicated.

Before curing, either in powder form or in partially reacted state, the mixture is soluble or dispersible in a solvent material, as indicated, forming a heat curable lacquer impregnant and coating material.

EXAMPLE V

Xylyleneglycol (5 g.), p-toluenesulfonic acid monohydrate (1.5 g.) and chloroform (50 ml.) were stirred together and heated at reflux for 20 hours while removing water continuously. The clear solution was then added to a dispersion of polynaphthylene (10 g.), prepared as in Example I, in chloroform. The combined solutions were then heated at reflux for 24 hours forming a useful heat curable lacquer. When the solvent was removed, by careful evaporation, the residual solid product was found to soften above 100° C., was resoluble and redispersible in a solvent, and, in either case, found to cure at about 200° C.

EXAMPLE VI

A mixture consisting of biphenyl (1.50 m.) and naphthalene (1.50 m.) at 120° C. was mixed with anhydrous aluminum chloride (4.00 m.). Then anhydrous cupric chloride (4.00 m.) was added in small increments and the reaction mixture stirred at 120° C. for 20 hours. The reaction product was cooled and washed as in the foregoing examples and dried. The product yielded the following fractions:

|  | Percent |
| --- | --- |
| 15% benzene–85% naphtha soluble | 15.3 |
| Chlorobenzene soluble | 46.0 |
| Chlorobenzene insoluble | 38.7 |

The soluble fraction was cured to an insoluble state when combined with a curing agent and heated as in the above Example V.

The above are exemplary of the fused ring type compounds and admixture with other aromatic compounds as monomers or polymers of phenylene oxide, phenylene sulfide, biphenyl, terphenyl, quaterphenyl, isomers thereof, mixtures thereof, and mixtures with other aromatic material in the form of monomers or phenylene oligomers and polyphenyls with not more than 5 aromatic rings. The fused ring aromatic monomer material can be prepared in modified or unmodified polymer form, or such polymers can be further mixed with monomers or polymers of the other aromatic compounds, as indicated, for curing with the curing agents in-situ, in monomer, or telomer form, as described. The xylylene glycol curing agent, when utilized in solution form may be prepared as a prepolymer of an aromatic polymethylol compound and acid polymerization catalyst, as described in our copending application, "Aromatic Resinous Curing System and Method," Ser. No. 665,303 as heretofore indicated However, as further disclosed, the curing agent preferably can consist of a polyfunctional aromatic sulfonyl chloride, with or without the addition of an acid polymerization catalyst, as herein indicated and more fully described in our cofiled application, "The Method of Producing New Aromatic Resins & Products Thereof," Ser. No. 665,269. Similarly, the curing agents noted therein are applicable herein for in-situ copolymerization and curing, of the fused ring compounds, as herein described and illustrated. Whereas, the preferred processing is as above described, the oxidant and catalyst can be premixed and then added to the liquid monomers or polymers, or a solvent or powder mixture thereof, can be initially prepared and heated to prepare the soluble polymers, as indicated.

As above exemplified and described in conjunction with the original claims, a method of commercially preparing useful resin forming soluble and fusible aromatic polymers of fused ring aromatic compounds selected from the group consisting of naphthalene, anthracene, phenanthrene, mixtures of the same, and mixtures of the same with other aromatic compounds selected from the group consisting of phenylene oxide, phenylene sulfide, biphenyl, ortho- and meta-terphenyl, quaterphenyl compounds, and mixtures of the same, including mixtures with other aromatic material with not more than five aromatic rings, is provided by the following generally illustrative of a desired processing:

(1) heating and stirring a liquid batch of said compounds containing;

(a) a quantity of oxidant material in an amount sufficient to fully aromatize the polymers formed from said compounds;

(b) a strong Lewis acid catalyst;

(2) maintaining the heating thereof relatively constant in an initial temperature range of about 100° C. for a brief period;

(3) continuing stirring and raising the reaction temperature in a range of from about 100° C. to about 150° C. for a period of time evidenced approximately by the evolution of hydrogen chloride;

(4) cooling, crushing, and extracting the oxidant and catalyst, and (5) recovering the soluble and fusible aromatic polymers from the mixture, as herein described.

Having described and illustrated the present embodiment of this improvement in the art in accordance with the patent statues, it will be apparent that some modification and variation may be made without departing from the spirit and scope thereof. The specific embodiments described are given by way of examples illustrative of the improvement discovered applicable herein.

What is claimed is:

1. A method of preparing cured, fully aromatic polynuclear aromatic polymers comprising the steps of:

(1) forming a polymerizable reaction mixture of (a) a monomer selected from the group consisting of at least one fused ring aromatic compound selected from the group consisting of naphthalene, anthracene, phenanthrene, and mixtures thereof with at least one aromatic compound selected from the group consisting of phenylene oxide, phenylene sulfide, biphenyl, ortho- and meta-terphenyl, quaterphenyl and mixtures thereof with other aromatic or heterocyclic compounds containing not more than five aromatic rings;

(b) a quantity of an oxidant material sufficient to fully aromatize the polymers formed from said monomers; and (c) a strong Lewis acid catalyst for polymerizing said monomers;

(2) heating and stirring said reaction mixture to a temperature of from 100° to 150° until the termination of the evolution of hydrogen chloride is evidenced to form a resin product;

(3) cooling and crushing the reaction mixture and extracting the oxidant and catalyst therefrom;

(4) recovering a chlorobenzene soluble, fusible and essentially fused ring aromatic polymer portion from the mixture having a melting point on the order of 138° C. to 280° C. and a carbon to hydrogen ratio on the order of 1.5 to 1.7;

(5) adding a curing agent selected from the group consisting of a sulfonic acid derivative of an aromatic polymethylol, a polyoxyxylylene and benzene trisulfonyl chloride to said soluble and fusible polymer portion; and (6) heat curing to form a reaction product of said portion and agent.

2. A method according to claim 1 in which said curing agent is a polyoxyxylylene.

3. A method according to claim 1 in which said curing agent is a sulfonic acid derivative of an aromatic polymethylol.

4. A method according to claim 1 in which the oxidant material is selected from at least one member of the group consisting of cupric chloride, cupric bromide, ferric chloride, mixtures of the same, and mixtures of the same with gaseous oxygen.

5. A method according to claim 4 in which the strong Lewis acid polymerization catalyst is selected from the group consisting of aluminum chloride, aluminum bromide, tantalum pentachloride, ferric chloride, antimony pentachloride, gallium tribromide, zirconium tetrachloride and mixtures thereof.

6. A method according to claim 5 in which the catalyst is aluminum chloride and the oxidant is cupric chloride.

7. A method according to claim 5 in which the catalyst and oxidant present in the mixture comprise a combination of aluminum chloride, ferric chloride and cupric chloride.

8. The product produced by the method of claim 1.

References Cited

UNITED STATES PATENTS

| | | | |
|---|---|---|---|
| 3,159,589 | 12/1964 | Bloomfield et al. | 260—2 |
| 3,376,235 | 4/1968 | Hartle | 260—2.2 |
| 3,431,221 | 3/1969 | Hoess | 260—2 |

FOREIGN PATENTS

| | | | |
|---|---|---|---|
| 1,000,679 | 8/1965 | Great Britain | 260—2 |
| 2,280 | 1/1967 | Japan | 260—2 |

OTHER REFERENCES

Kovacic et al.: "Jour. Oragnic Chem.," vol. 29 (January 1964), pp. 100–104.

Berlin et al.: "Chemical Abstracts," vol. 67 (1967), 82422j.

Badische Anilin & Soda Fabrik, Dutch application 6404921, printed November 1964.

Borg-Warner Corp., Dutch application 6609825, printed January 1967 (67 Chem. Abstracts 11979k).

SAMUEL H. BLECH, Primary Examiner

U.S. Cl. X.R.

117—161; 161—182; 260—33.6, 33.8, 47, 79, 79.3, 823